(12) United States Patent
Blumke et al.

(10) Patent No.: US 6,553,818 B1
(45) Date of Patent: Apr. 29, 2003

(54) EXHAUST FLOW CALIBRATION APPARATUS AND METHOD

(75) Inventors: Dennis M Blumke, Washington, MI (US); Majed S Marji, Dearborn, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/618,742

(22) Filed: Jul. 18, 2000

(51) Int. Cl.[7] .............................................. G01M 19/00
(52) U.S. Cl. ..................................................... 73/118.1
(58) Field of Search ............................... 73/116, 118.1, 73/23.31, 1.01–1.89

(56) References Cited

U.S. PATENT DOCUMENTS

| | | |
|---|---|---|
| 4,823,591 A | 4/1989 | Lewis |
| 5,038,608 A | 8/1991 | Sakai et al. |
| 5,233,861 A | 8/1993 | Gore et al. |
| 5,650,565 A | 7/1997 | Nagy et al. |
| 5,739,413 A | 4/1998 | Kohn et al. |
| 5,918,256 A | 6/1999 | Delaney |
| 2001/0013245 A1 * | 8/2001 | Hanashiro et al. ......... 73/23.31 |

OTHER PUBLICATIONS

Sketch of E–flow unit calibration prepared by inventor Dennis M. Blumke, not necessarily prior art.

* cited by examiner

*Primary Examiner*—Eric S. McCall
*Assistant Examiner*—Maurice Stevens
(74) *Attorney, Agent, or Firm*—Ralph E. Smith

(57) ABSTRACT

A method and apparatus calibrates an exhaust gas measurement system for a motor vehicle. The method includes the steps of providing a flow of air to the exhaust gas measurement system having a known flow rate, measuring and storing a signal output from the exhaust gas measurement system, repeating the first two steps a predetermined plurality number of times, calculating a calibration curve based on the known flow rates and the stored signal; and using the calibration curve in the exhaust gas measurement system.

17 Claims, 6 Drawing Sheets

US 6,553,818 B1

EXHAUST FLOW CALIBRATION APPARATUS AND METHOD

BACKGROUND OF THE INVENTION

1. Technical Field

The present invention generally relates to an apparatus and method to calibrate an exhaust flow measurement apparatus, and more particularly, to an arrangement for providing a known flow reference signal to the exhaust flow measurement apparatus and measuring the response of that unit to the reference signal.

2. Discussion

Several vehicle exhaust flow measurement methods have been developed over time. One method compares an initial concentration of carbon dioxide within a vehicle's exhaust to a diluted carbon dioxide measurement taken after outside air has been mixed with the exhaust. This method utilizes the dilution ratio of carbon dioxide to calculate the quantity of other exhaust gas constituents such as carbon monoxide.

A constant volume sample is coupled to the vehicle exhaust to collect gas samples for testing. It should be appreciated that the constant volume sampler functions properly only when the sample is completely gaseous. To assure that water does not condensate within the constant volume sampler, a large quantity of outside air must be added to the vehicle exhaust. Unfortunately, after a water correction factor is taken into account, the method is accurate to only within 10 percent.

Another exhaust flow measurement technique incorporates a smooth approach orifice and a constant volume sampler. The constant volume sampler is plumbed directly in-line with the vehicle exhaust and the smooth approach orifice. Thus, the sum of the gas flow from the vehicle exhaust and the gas flow through the smooth approach orifice equals the flow through the constant volume sampler. Accordingly, if the constant volume sampler flow rate is known and the smooth approach orifice flow rate is known, the vehicle exhaust flow may be calculated. However, only very small pressure drops are present within the smooth approach orifice. As is known, it is very difficult to accurately quantify small changes in pressure and this method is therefore subject to relatively large percentage errors.

A preferred method of exhaust flow measurement involves using an ultrasonic measurement device. Ultrasonic exhaust flow measurement units are used to quantify exhaust gas volumes directly from the tailpipe of a vehicle. Each exhaust flow unit has its unique calibration curve relating the output signal measured by the device to the amount of flow passing through it. The calibration curve is provided by the manufacturer of the unit and is built into the program that controls it.

As is known, the physical characteristics of any precision measurement device are subject to changes over time. These changes necessitate revising the calibration curve to reflect the changes in the measurement device. In the past, recalibration required sending the entire exhaust flow measurement device back to the manufacturer. This process was time consuming and very expensive.

SUMMARY OF THE INVENTION

Accordingly, it is an object of the present invention to provide a method and apparatus to calibrate an exhaust flow measurement device.

It is another object of the present invention to cost effectively and accurately provide a known flow reference signal for use in calibrating an exhaust flow measurement device.

The present invention includes a method and apparatus for calibration of an exhaust gas measurement system for a motor vehicle. The method includies the steps of providing a flow of air to the exhaust gas measurement system having a known flow rate, measuring and storing a signal output from the exhaust gas measurement system, repeating the first two steps a predetermined plurality number of times, calculating a calibration curve based on the known flow rates and the stored signal; and using the calibration curve in the exhaust gas measurement system.

BRIEF DESCRIPTION OF THE DRAWINGS

FIG. 7 is a schematic drawing representative of the preferred exhaust flow calibration unit coupled to an exhaust flow measurement device;

FIG. 8 is a schematic drawing showing another embodiment of the exhaust flow calibration unit and exhaust flow measurement device interconnection;

DETAILED DESCRIPTION OF THE PREFERRED EMBODIMENT

Figure 1:
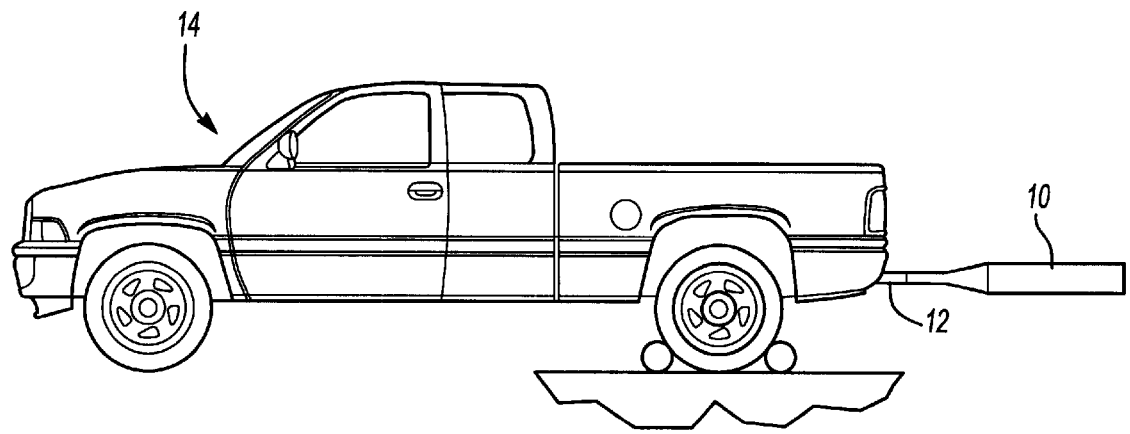
FIG. 1 is a side view of an exemplary vehicle coupled to a portion of an exhaust flow measurement device.
Figure 2:
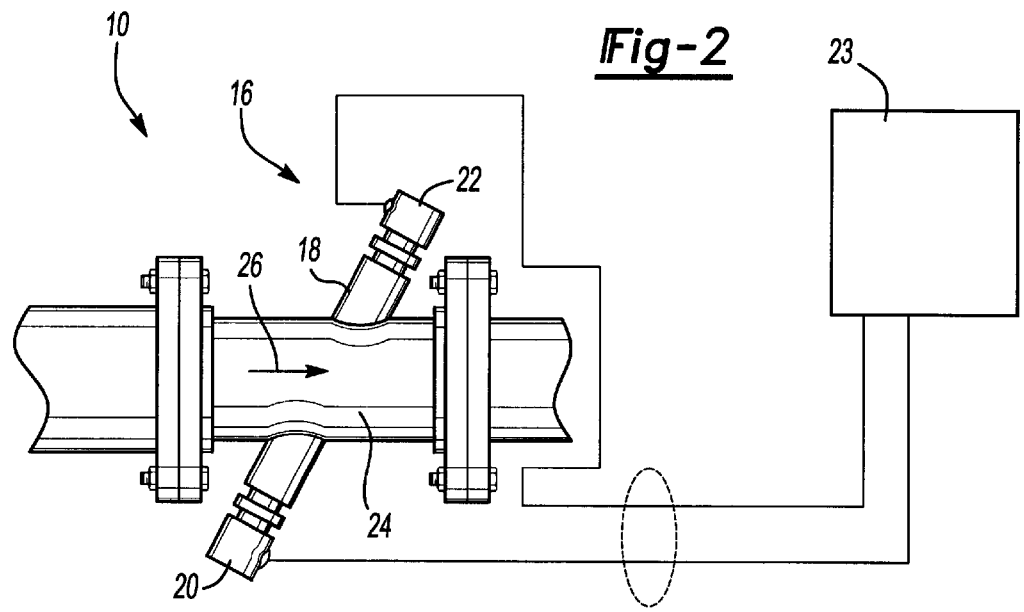
FIG. 2 is a fragmentary side view of an exhaust flow measurement device.

Referring to FIGS. 1 and 2, an exemplary ultrasonic exhaust flow unit is generally identified at reference numeral 10. Exhaust flow unit 10 is plumbed in-line with a tailpipe 12 of a vehicle 14. Exhaust flow unit 10 includes an ultrasonic measurement device 16 having a generally circular hollow cylindrical housing 18, a first sensor 20 and a second sensor 22 in communication with a timer 23. Housing 18 is mounted at an angle other than 90° relative to a test chamber 24 coupled to tailpipe 12. Exhaust flow unit 10 functions by sending a first signal from first sensor 20 to second sensor 22. The elapsed time for the signal to travel from the first sensor to the second sensor is measured by timer 23. Noting that the direction of exhaust gas flow corresponds to an arrow 26, the first signal is assisted by the velocity of the exhaust gas. A second signal is sent from the second sensor 22 to the first sensor 20. It should be appreciated that this signal is retarded by the exhaust gas flow. The time required for the second signal to travel from second sensor 22 to first sensor 20 is also measured. Because the inner diameter of test chamber 24 is known and the angle at which housing 18 is mounted relative to test chamber 24 is also known, it is possible to calculate the instantaneous gas flow by comparing the difference in elapsed times for first and second signals to travel to their respective sensors.

Figure 3:
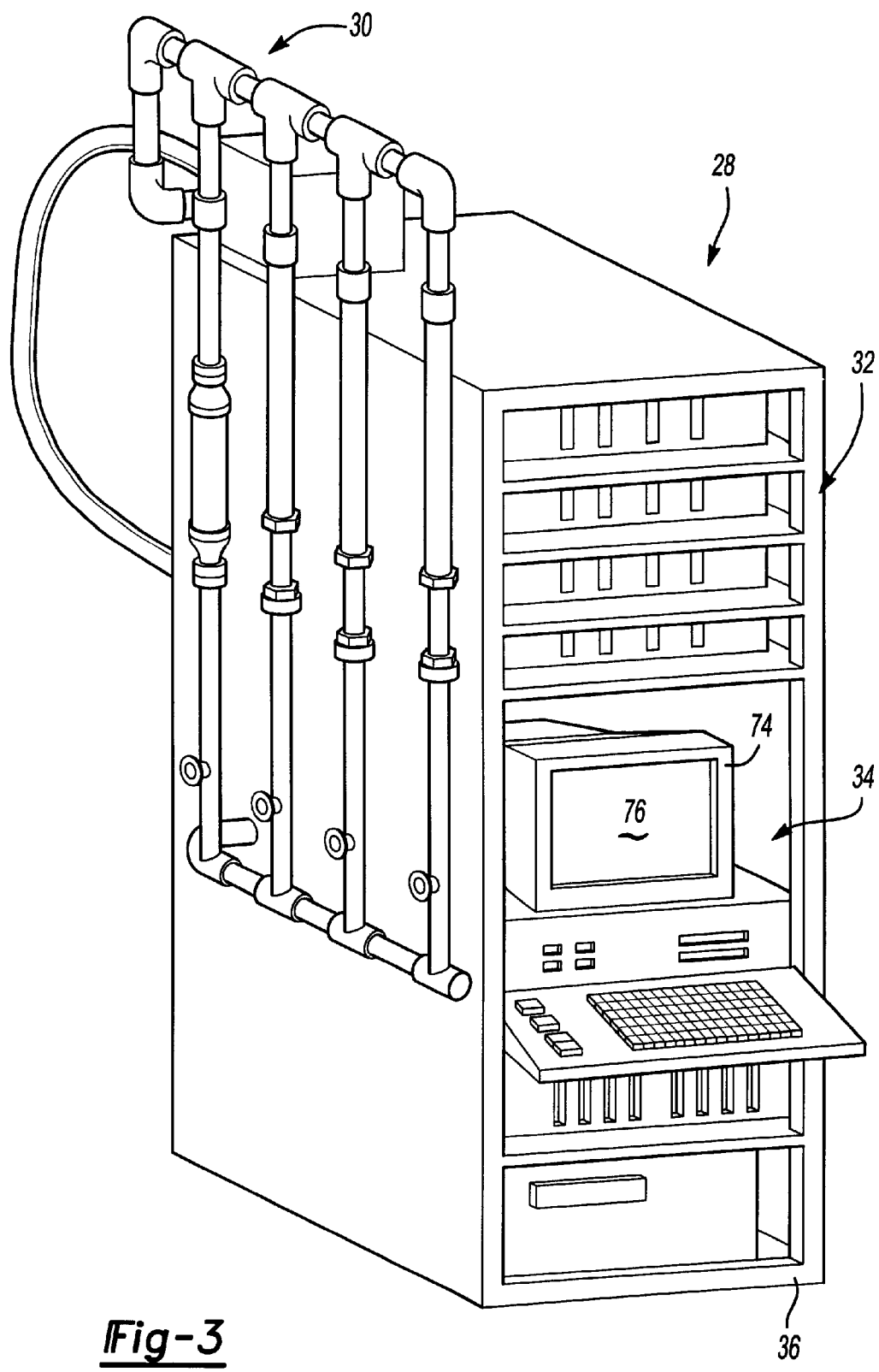
FIG. 3 is a perspective view of an exhaust flow calibration unit constructed in accordance with the teachings of the present invention.

As mentioned earlier, periodic calibration of exhaust flow unit 10 should be conducted to assure optimum accuracy and performance. Referring to FIG. 3, an exhaust flow calibration unit is generally identified at reference numeral 28. Exhaust flow calibration unit 28, hereinafter referred to as calibration unit 28, includes a suction circuit 30, a central processing unit 32 and a user interface 34. In general, suction circuit 30 provides an adjustable suction flow rate connectable to exhaust flow unit 10. Central processing unit 32 collects data representing the flow rates applied from suction circuit 30 and corresponding measured flow rate data supplied from exhaust flow unit 10. Central processing unit 32 stores and compares the aforementioned data in a manner discussed in greater detail hereinafter. User interface 34 provides an operator with real time access to the data and a method for varying the suction flow rate. Suction circuit 30, central processing unit 32 and user interface 34 are all conveniently housed in a cabinet 36 which is portable for use in different locations.

Figure 4:
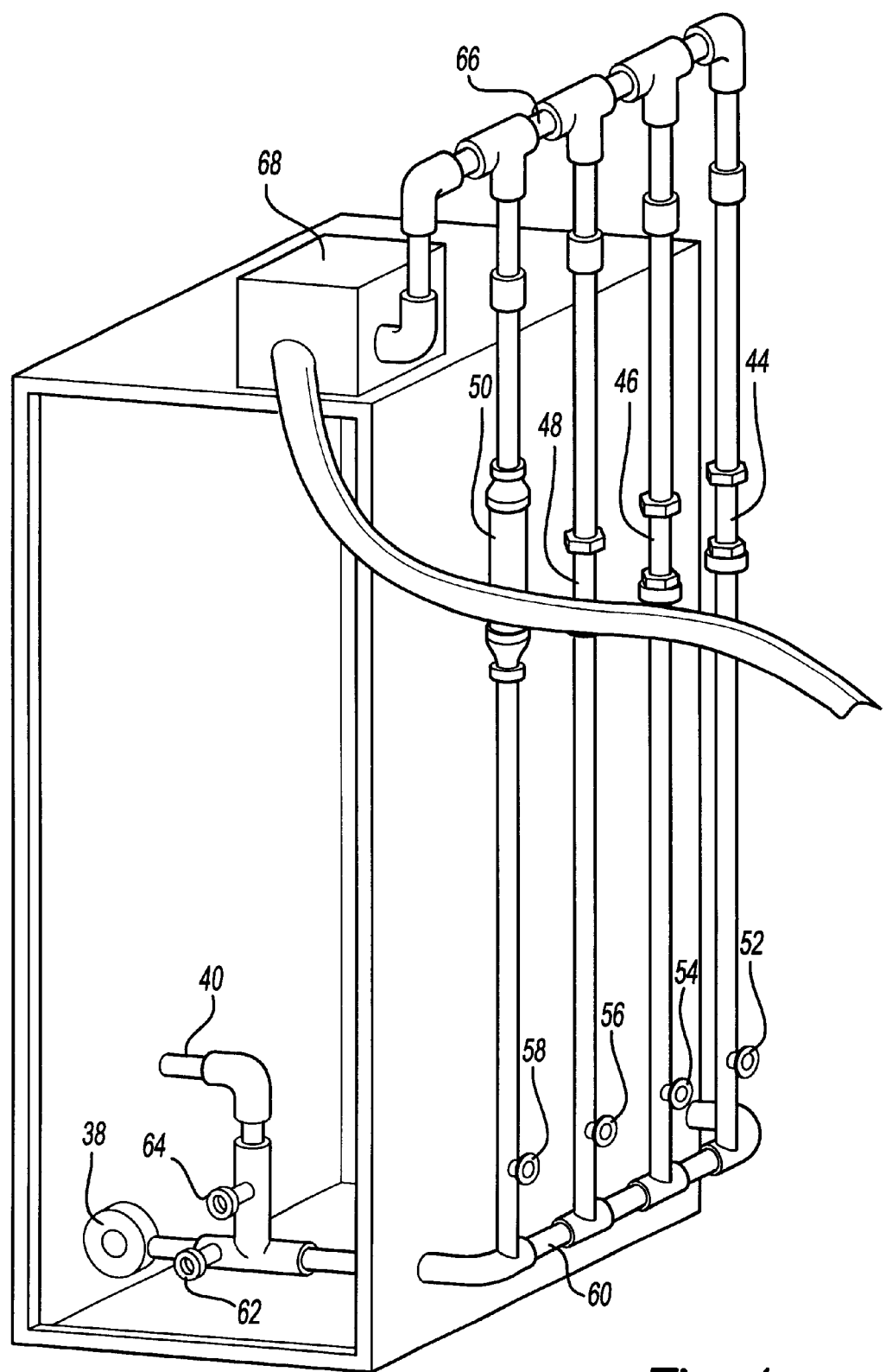
FIG. 4 is another perspective view of the preferred exhaust flow calibration unit.
Figure 5:
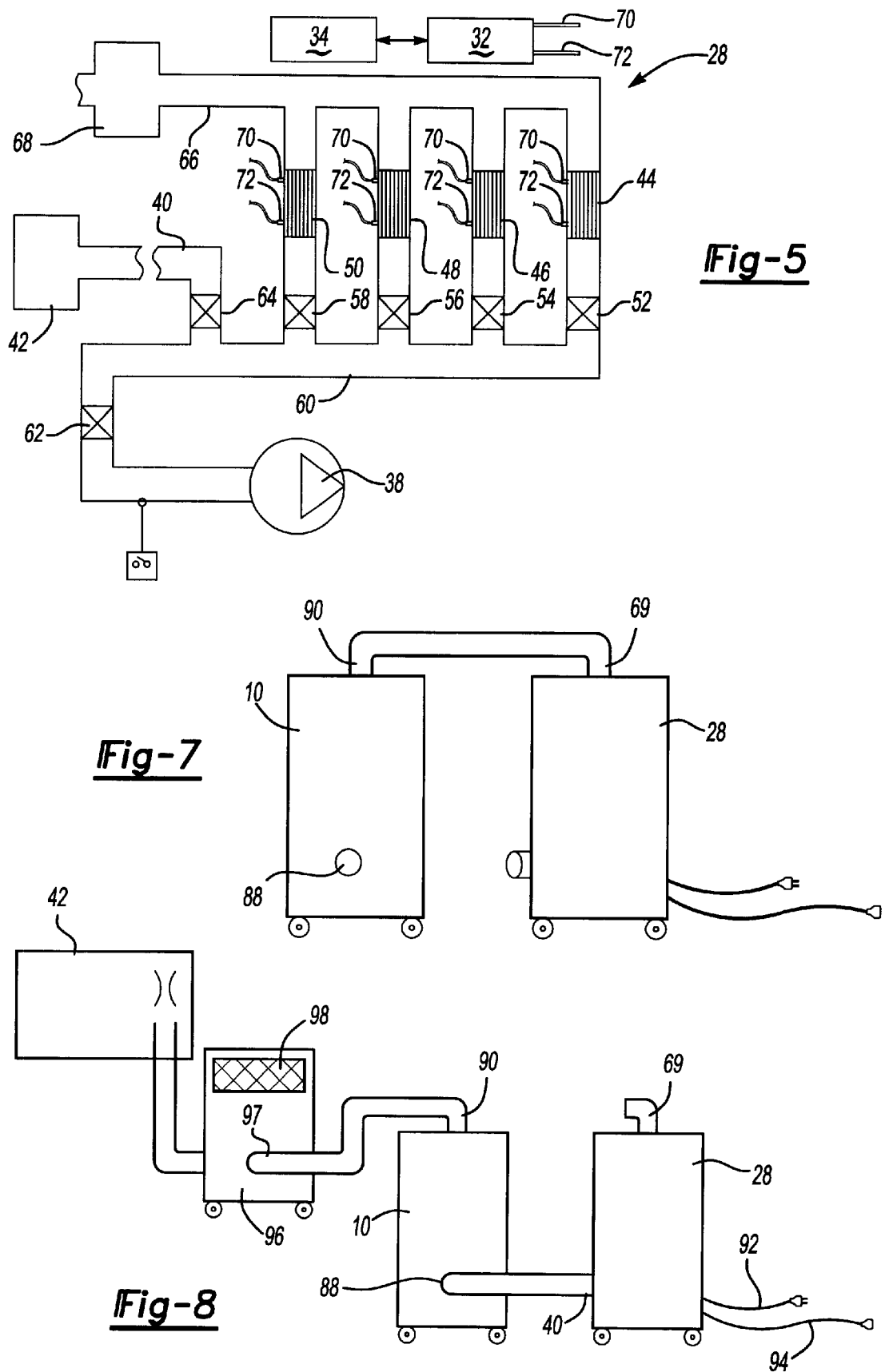
FIG. 5 is a schematic drawing representative of the preferred exhaust flow calibration unit.

Referring to FIGS. 3, 4 and 5, suction circuit 30 includes a blower motor 38 as a primary source of vacuum. Suction circuit 30 also includes a valved outlet 40 connectable to an alternate source of suction such as a constant volume sampler 42. Regardless of how suction is created, air may be drawn through four laminar flow elements to produce a desired volumetric flow rate. For example, each of a first laminar flow element 44, a second laminar flow element 46 and a third laminar flow element 48 is preferably rated at a maximum flow rate of 40 cubic feet per minute. A fourth laminar flow element 50 is preferably rated at 100 cubic feet per minute. Each of the laminar flow elements are piped in parallel to provide a regulated known suction flow rate in the range of 0 to 220 cubic feet per minute. Adjustment of the total suction flow rate generated by calibration unit 28 is accomplished by opening and closing valves associated with each laminar flow element. Specifically, a first valve 52 is plumbed in series with first laminar flow element 44. Correspondingly, the flow rate through second laminar flow element 46 is controlled by a second valve 54. A third valve 56 limits the flow through third laminar flow element 48. The flow through fourth laminar flow element 50 may be selectively restricted by a fourth valve 58. A lower rail 60 interconnects each of the laminar flow elements to the suction source be it either blower motor 38 or constant volume sampler 42. A first shutoff valve 62 separates blower motor 38 from lower rail 60 when closed. Similarly, a second shut-off valve 64 is positioned between outlet 40 and lower rail 60. Second shut-off valve 64 is closed when blower motor 38 is used as the suction source. An upper rail 66 connects each of the laminar flow elements to outside air via a filter 68 and an inlet 69.

Suction circuit 30 is constructed using laminar flow elements 44, 46, 48 and 50 to provide an operator of calibration unit 28 a method to supply an accurate suction flow rate ranging from 0 to 220 cubic feet per minute. It should be appreciated that the 220 cubic feet per minute sum is merely exemplary and that a variety of differently rated laminar flow elements may be interconnected to meet a specific need or purpose.

Each of the laminar flow elements includes an upstream pressure transducer 70 and a downstream pressure transducer 72 electrically coupled to central processing unit 32. In the preferred embodiment, each of the laminar flow elements has a full scale volumetric flow rate equal to a pressure drop of 8 inches of water. The laminar flow elements are designed to linearly correlate pressure drop to volumetric flow rate. For example, a pressure drop of 4 inches of water across laminar flow element 44 equates to a flow rate of 20 cubic feet per minute. Twenty (20) cubic feet per minute was determined by multiplying the maximum rated flow rate of 40 cubic feet per minute by the ratio of a pressure drop of 4 inches of water divided by a full scale pressure drop of 8 inches of water. Central processing unit 32 performs the calculation previously mentioned for each of the laminar flow elements and then sums them to provide a total suction flow rate.

Figure 6:
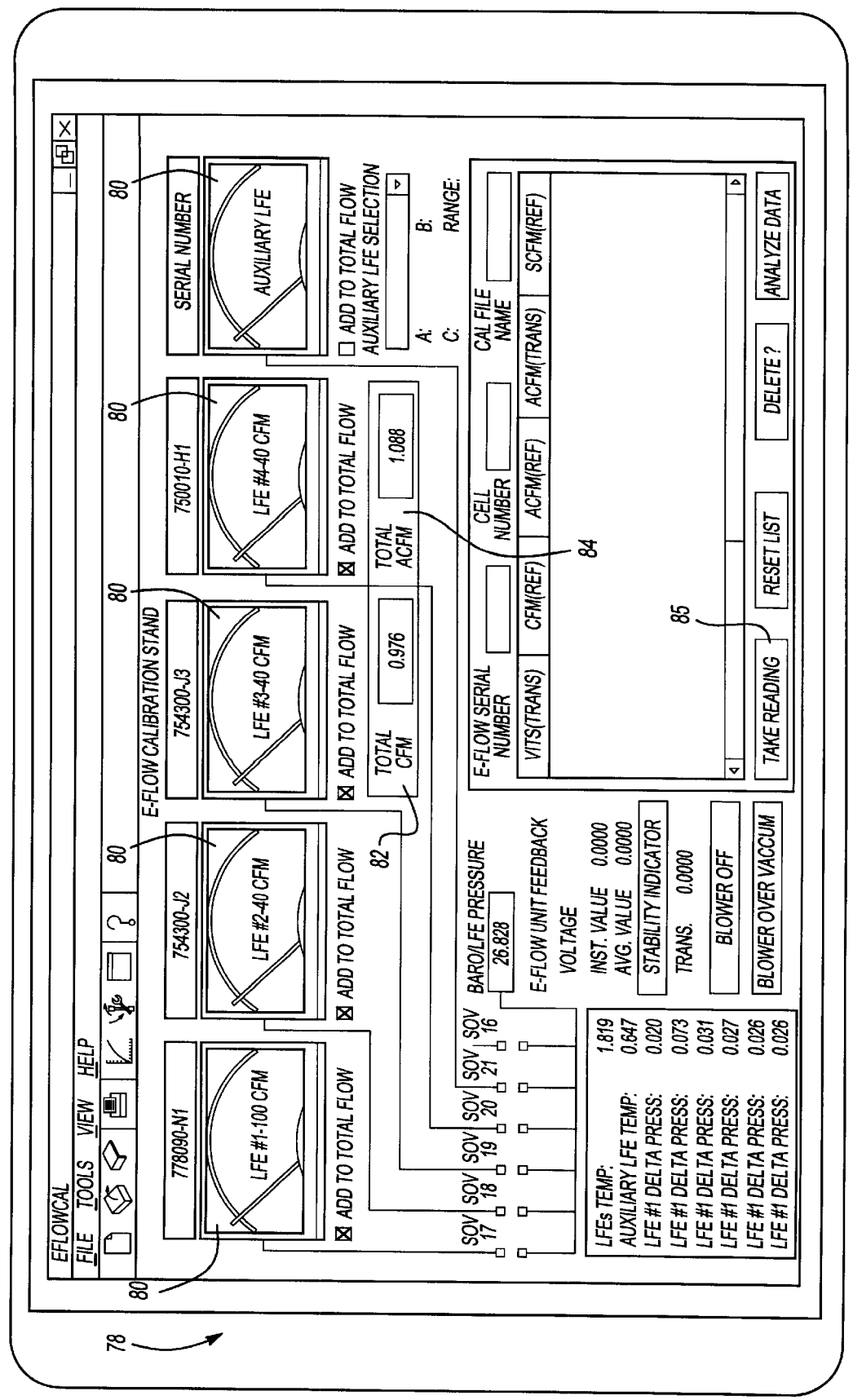
FIG. 6 is a graphical display operative with the preferred exhaust-flow calibration unit.

User interface 34 accepts data provided from central processing unit 32 and displays it in easily understandable format. User interface 34 includes a monitor 74 having a readable screen 76. As shown in FIG. 6, screen 76 includes a graphical display 78 having a plurality of analog gages 80 corresponding to each of the laminar flow elements. The total flow rate provided by suction circuit 30 is displayed as Total CFM 82. Once suction is applied, exhaust flow unit 10 calculates a flow rate as earlier described. This flow rate is displayed on graphical display 78 as a separate data-point entitled Total ACFM 84. Additional data such as pressure differential across each laminar flow element, atmospheric pressure, and temperature may be displayed.

Central processing unit 32 collects a number of data sets pairing Total CFM 82 with Total ACFM 84 and stores them for later mathematical analysis. Preferably, fifteen or more different data sets are collected and stored. Once a known Total CFM 82 is input to obtain a corresponding Total ACFM 84, a user may direct CPU 32 to measure and record the CFM 82 and ACFM 84 data pair by selecting a TAKE READING field 85. To properly construct a calibration curve, different Total CFM 82 rates are input to span the useful range of the exhaust flow unit to be calibrated.

A calibration curve is calculated based on the charted data pairs. The curve may be generated by a variety of methods including a least square fit polynominal. In the preferred embodiment, a first order polynominal curve fitting technique is used. Once calibrated, the calibration curve is input within the software controlling the exhaust flow unit to correct any error detected in exhaust flow unit 10 measurements.

With reference to FIG. 7, a first method of interconnecting calibration unit 28 with exhaust flow unit 10 is shown. In this method, blower motor 38 (FIG. 5) is used as the vacuum source. Exhaust flow unit 10 includes an intake port 88 and an exhaust port 90. Because blower motor 38 provides suction at a specified rate, exhaust port 90 is simply connected to air inlet 69 to complete the circuit. Thus, fresh air is drawn through intake port 88 and exits at exhaust port 90. Air continues to travel through air inlet 69 into calibration unit 28. One or any of the combination of the laminar flow elements previously mentioned are next met. The air passing through each of the laminar flow elements combines as it is drawn through the blower motor. A first cord 92 is adapted to provide 110 volts AC to central processing unit 32 and user interface 34. A second cord 94 couples blower motor 38 to a three phase, 480 volt source to power the blower motor.

FIG. 8 depicts another method of interconnecting calibration unit 28 and exhaust flow unit 10. Because blower motor 38 has a limited volumetric flow rate, it may be necessary to utilize a different source of suction having greater capacity. Specifically, constant volume sampler 42 is capable of providing a suction flow rate in the range of 500 cubic feet per minute while blower motor 38 is preferably sized to provide a flow rate of 220 feet per minute. However, it should be appreciated that constant volume sample 42 is intolerant to condensation or liquid content of any form. As such, a mix box 96 is plumbed in-line prior to constant volume sampler 42 to add an appropriate amount of air to assure condensation of liquid does not occur within constant volume sampler 42. Tracing the air path once again, air is drawn into air inlet 69 passing through the designated laminar flow elements of calibration unit 28, exiting at outlet 40. Air continues to travel through intake port 88, ultrasonic measurement device 16 and exhaust port 90 of exhaust flow unit 10. The air passes through a mix box inlet 97 where it is joined with atmospheric air entering through a screen 98. The combination of air entering through screen 98 and mix box inlet 97 are drawn through constant volume sampler 42.

Figure 9:
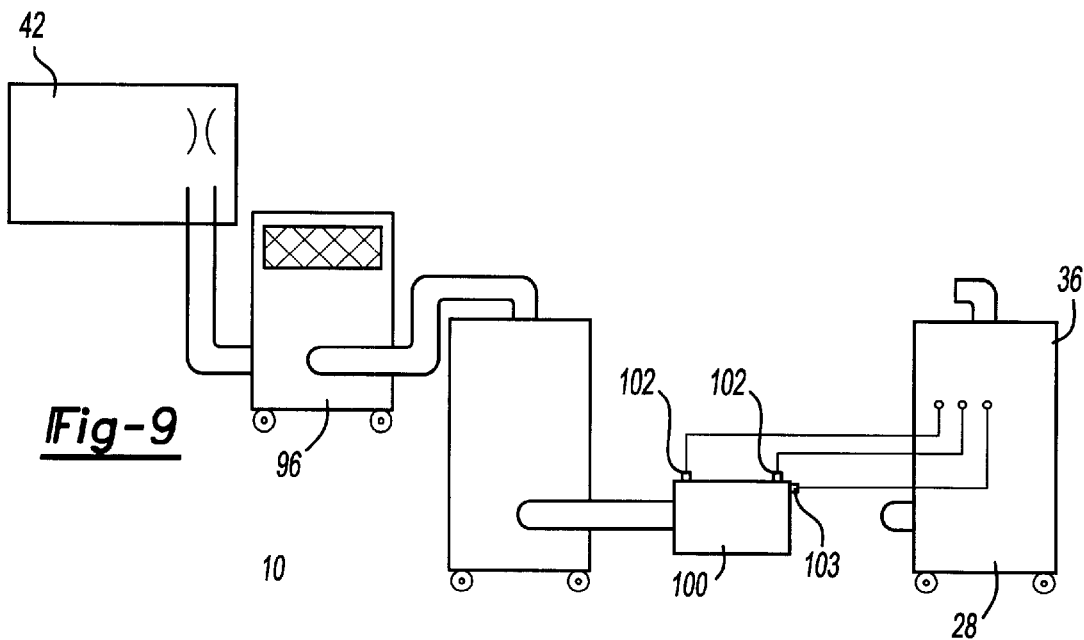
FIG. 9 is a schematic drawing showing another embodiment of the exhaust flow calibration unit and exhaust flow measurement device interconnection.

FIG. 9 depicts yet another method of interconnecting calibration unit 28 with exhaust flow unit 10. In this method, a very large laminar flow element 100 is plumbed to communicate with constant volume sampler 42, mix box 96 and exhaust flow unit 10. Laminar flow element 100 is too large to be reasonably fitted within a portable housing such as cabinet 36. Accommodation for such a large laminar flow element may be made by plumbing laminar flow element 100 to intake port 88 of exhaust flow unit 10. A pair of pressure transducers 102 and a temperature transducer 103 are coupled to laminar flow element 100. Each pressure transducer 102 electrically communicates with calibration unit 28 as if laminar flow element 100 were mounted within cabinet 36.

Figure 10:
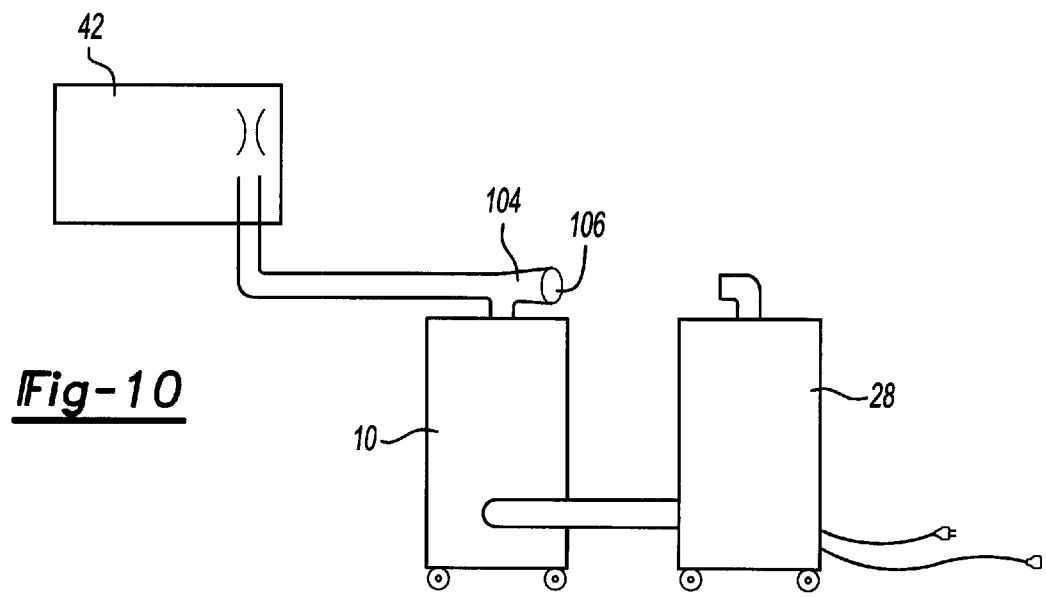
FIG. 10 is a schematic drawing showing another embodiment of the exhaust flow calibration unit and exhaust flow measurement device interconnection.

With reference to FIG. 10, an alternate embodiment of the exhaust flow unit 10 and calibration unit 28 interconnection is shown. It should be appreciated that the embodiment depicted in FIG. 10 functions substantially similarly to the embodiment previously described with reference to FIG. 8. The embodiment depicted in FIG. 10 includes constant volume sampler 42 coupled to exhaust flow unit 10 which is in turn coupled to calibration unit 28. However, it should be noted that instead of a mix box, a mix tee 104 provides an opening 106 for atmospheric air to mix with the exhaust gas prior to entering constant volume sampler 42.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed:

1. A method for calibration of an exhaust gas flow measurement system for a motor vehicle, including the steps of:

providing a flow of air to the exhaust gas flow measurement system having a known flow rate;

measuring and storing a signal indicative of air flow output from the exhaust gas flow measurement system;

repeating the first two steps a predetermined plurality number of times;

calculating a calibration curve based on the known flow rates and the stored signal; and using the calibration curve in the exhaust gas flow measurement system.

2. The method of claim 1 wherein the step of providing a flow of air having a known flow rate includes pumping air through a laminar flow element.

3. The method of claim 2 wherein flow through said laminar flow element is limited by a valve.

4. The method of claim 1 wherein the step of measuring and storing a signal includes electrically coupling said exhaust gas flow measurement system to a central processing unit.

5. The method of claim 1 further including displaying said signal and said known flow rate on a monitor.

6. The method of claim 1 wherein the step of using said calibration curve includes modifying said exhaust gas flow measurement system to output a corrected signal equal to said known flow rate.

7. An exhaust flow calibration unit for calibration of an exhaust flow measurement device, the calibration unit comprising:

an air flow circuit to provide a known air flow rate; and a central processing unit in communication with said air flow circuit, said central processing unit storing data corresponding to said known air flow rate and a signal output from said exhaust flow measurement device in response to said known air flow rate and calculating a calibration curve therefrom.

8. The calibration unit of claim 7 wherein said air flow circuit includes a plurality of laminar flow elements operable to provide said known air flow rate.

9. The calibration unit of claim 8 wherein each of said plurality of laminar flow elements is plumbed in series with a valve to restrict flow through said laminar flow element.

10. The calibration unit of claim 9 wherein said air flow circuit includes a device to draw air through said plurality of laminar flow elements.

11. The calibration unit of claim 10 wherein said air drawing device is a blower motor.

12. The calibration unit of claim 10 wherein said air drawing device is a constant volume sampler.

13. The calibration unit of claim 12 further including a mix box plumbed to add outside air to said known air flow prior to entering said constant volume sampler.

14. The calibration unit of claim 7 further including a user interface in electrical communication with said central processing unit.

15. The calibration unit of claim 14 wherein said user interface includes a monitor to visually display at least a portion of said data.

16. The calibration unit of claim 15 wherein said user interface includes an input receiver to accept a command to collect said data.

17. The calibration unit of claim 16 wherein said input receiver accepts a command to store said data.

* * * * *